3,526,645
CATALYTIC EPOXIDATION OF
OLEFINIC COMPOUNDS
Erwin Vangermain, Marl, and Jürgen Wolpers, Haltern, Germany, assignors to Chemische Werke Huls A.G., Marl, Germany
No Drawing. Filed July 19, 1966, Ser. No. 566,234
Claims priority, application Germany, July 30, 1965, C 36,538
Int. Cl. C07d 1/08
U.S. Cl. 260—348.5                        18 Claims

ABSTRACT OF THE DISCLOSURE

Greatly increased yields are obtained in the epoxidation of olefinicially unsaturated compounds by conducting the epoxidation reaction in the presence of:

(A) a compound of a metal from sub-groups IV to VI of Mendeleev's Periodic Table; and (B) a compound of a metal of Group VII or VIII of the Periodic Table.

In addition, compounds (A) and (B) can be combined into a single compound of both metals, e.g. cobalt molybdate and nickel tungstate.

---

This invention relates to a catalytic process for the epoxidation of olefinic compounds.

Organic compounds carrying epoxide groups have gained increasing importance in many areas of chemical technology, for example as plasticizers and stabilizers in plastic composition, as intermediate products for organic synthesis, and as starting materials for the production of polymers.

Various processes are already known for the conversion of olefinic compounds into epoxides.

The direct catalytic oxidation of olefins with oxygen can be accomplished satisfactorily only in case of ethylene and, with certain limitations, in the case of propylene. All other epoxy compounds previously produced from olefins were made with the aid of very active reactants, such as $H_2O_2$ and peracids. Such active reactants had the disadvantage (not even considering economical factors) of resulting in either the formation of both an organic and an aqueous phase with concomitant distribution and separation problems; or in the case of peracids, they enter into deleterious side reactions with freshly formed epoxide.

According to the Dutch patent application No. 6,402,-137, lower olefins and allyl alcohol can be epoxidized with an organic hydroperoxide in the presence of an inorganic molybdenum compound. In this reaction, however, only 41–51% of the hydroperoxide is converted, and the corresponding olefin-derived epoxy compound is obtained in yields of 86.7 to 96.5%, based on reacted oxidation agent, but in yields of 40 to 44%, based on the initial hydroperoxide employed.

With respect to the formation of glycide from allyl alcohol, the yield is only 22.5% of theory, based on the hydroperoxide employed. Thus, in the latter case a particularly large portion of the employed oxidation agent is lost unused.

Still another process is given in Belgian Pat. No. 641,-452, wherein epoxy compounds are produced by the reaction of lower olefins with organic peroxy compounds in the presence of soluble compounds of vanadium, molybdenum, tungsten, or selenium. With respect to propylene in particular, it is seen that it forms propylene oxide with tert.-butyl hydroperoxide in the presence of molybdenum naphthenate with a conversion of 33.6% hydroperoxide and a selectivity of 86%. The yield in epoxy compound, based on the oxidation agent used, is thus less than 29% of theory.

These two just described Dutch and Belgian processes have disadvantages from both economical and technical considerations. Both processes require tert.-butanol as the solvent which, though recoverable to a substantial degree, involves additional steps and material. The most serious disadvantage of these processes, however, is that because only half or less of the hydroperoxide takes part in the reaction, there remains a high peroxide content in the reaction product. This is highly unfavorable not only from an economic viewpoint, but also with respect to the great hazard of an uncontrolled decomposition resulting in an explosion. This is a particular problem since it would otherwise be particularly advantageous to combine the reactants simultaneously, but because of the problem of possible violent reactions, the process is limited to the use of small charges.

A principal object of the invention, therefore, is to provide an improved process for the epoxidation of ethylenically unsaturated compounds.

Other objects and advantages of this invention will become apparent upon further study of the specification and appended claims.

To attain the objectives of this invention, it has surprisingly been discovered that olefins can be epoxidized with a high conversion in excellent yields with the aid of organic hydroperoxides in the presence of heavy metal catalysts, if there is used, as the catalyst, (A) a compound of a metal of Groups IV to VI of the Mendeleev Periodic Table, on the one hand, and (B) a compound of a metal of Subgroups VII or VIII of the Mendeleev Periodic Table, on the other hand. In this connection, it is preferred that one of the reactants is mixed with the catalyst system, and that this mixture is added slowly in small portions to the second reactant, the latter, more advantageously being premixed with the catalyst system.

The success of this process is unexpected since it is known, from J. Chem. Soc. 1959, 2169, and from J. Am. Chem. Soc. 85, 141 (1963) that compounds of the elements of Groups VII and VIII of the Periodic Table, when used as sole catalysts, completely prevent the epoxidation, or reduce the same to a small fraction of the uncatalyzed reaction.

All compounds having C=C double bonds are amenable to the novel epoxidation process. For example there can be used the simple straight-chain olefins, for example, propylene, octene-(2), the branched olefins, for example, 2-ethylhexene-(1), 4,4-dimethyl - 2 - methyl-pentene-(2), and the cyclic olefins with single and higher ring systems (e.g. 2 to 4 rings), for example, cyclohexene, cyclodecene, limonene, α-pinene, up to the high-molecular weight polydiolefins, e.g. polybutadiene. Also suitable in this connection are conjugated di- and polyolefins, such as, for example, trans-decatriene-(1,4,9), cyclododecatriene-(1,5,9), and cyclodecadiene-(1,3), which can be converted to compounds having one or several epoxide groups, depending upon the relation of C=C double bonds to the amount of hydroperoxide. In general, the olefin can thus contain from 2 to about 3,700, preferably 3 to 30 carbon atoms, and 1 to 900, preferably 1 to 3 ethylenically unsaturated bonds. It is also desirable for such compounds to be soluble to at least the extent of 50 g. per liter of solvent at 100° C.

In addition to the olefinic compounds consisting only of carbon and hydrogen, it is also possible to epoxidize, with excellent yields corresponding ethylenically unsaturated organic compounds which carry reactive groups. For example, allyl alcohol can be converted into glycide with a yield about 90%; similarly, methallyl alcohol, rhodinal-(2,2-dimethyl-octen-2-ol-(8)), geraniol, and oleyl alcohol can also be reacted. Other examples for substituted olefins which may be employed in the novel process are unsaturated ethers, such as diallyl ether, vinyl ether aldehydes such as ethyl hexenal, and ketones, such as benzalacetone.

Inasmuch as organic halides, nitro compounds, nitriles, carboxylic acids, esters, tertiary and secondary amines, N-substituted amides, and sulfones do not interfere with this reaction; as will be seen hereinafter, the olefins to be employed can themselves carry these groups; therefore, likewise suitable are, for example, 4-chlorocyclohexene-(1), 4-cyanocyclohexene-(1), oleic acid, linolenic acid ethyl ester, unsaturated fats, and butadienesulfone-(1,1-dioxo-1-thiacyclopentene-(3)).

Thus, the ethylenically unsaturated compound is defined as any epoxidizable organic compound of the formula $>C=C<$ wherein the free valences are satisfied by moieties which do not interfere with the epoxide reaction under the conditions of the process of this invention.

Suitable epoxidation agents are all conceivable organic hydroperoxides and hydroxy-hydroperoxides. Easily obtainable inexpensive hydroperoxides are preferably employed, for example, tert.-butyl-hydroperoxide, cyclohexenyl-hydroperoxide, and cumene-hydroperoxide, as well as the hydroperoxide of cyclohexanol, of isopropanol, and of butanol-(2). Other organic hydroperoxides, as are presently obtainable, and as will be obtainable in the future are also to be considered useful in the present invention.

Suitable catalyst systems comprise (A) compounds of the metals of Subgroups IV to VI of the Periodic Table, particularly vanadium, molybdenum, tungsten, titanium, zirconium, and tantalum, and, (B) compounds of the metals of Group VII or VIII of the Periodic System, particularly manganese, iron, cobalt, and nickel.

Among the most effective compounds of the metals of Subgroups IV to VI of the Periodic Table are the oxygen compounds, such as $V_2O_5$, $MoO_3$, and peroxytitanyl sulfate; acids and peracids, polyacids, such as molybdic acid, polyvanadic acid; salts of inorganic acids, such as titanyl sulfate, vanadium-(III)-chloride, zirconium nitrate; salts of organic acids, such as vanadium oleate and vanadium naphthenate; heteropolyacids, such as sodium phosphorus tungstate; organic complex compounds, such as vanadium acetylacetonate; vanadyl acetylacetonate, molybdenum acetylacetonate, vanadium-8-hydroxyquinoline, and esters, for example vanadyl propyl ester or tetraisopropyl titanate.

Among the effective compounds of the metals of Subgroups VII and VIII of the Periodic Table are oxides and hydroxides, such as MnO, $Mn_2O_3$, $Fe_2O_3$, CoO(OH), and $Ni(OH)_2$, acids, and salts of acids, such as ferrates, salts of inorganic and organic acids, such as $FeSO_4$, $NiCl_2$, $CoCO_3$, manganese naphthenate, ruthenium-p-tert.-butyl benzoate, organic complex compounds, such as manganese acetylacetonate, ferrocene, and nickel dimethyl glyoxime.

Of course, those compounds can also be employed which contain both a metal of (A) Subgroups IV to VI and (B) VII or VIII of the Periodic Table, such as $CoMoO_4$ and $NiWO_4$. In these cases, a single compound is sufficient.

The particularly preferred catalyst compounds are:

COMPOUND A molybdenyl acetylacetonate
molybdenum naphthenate
$MoO_3$ (molybdenum (VI) oxide)
vanadium (V) oxide
ammonium vanadate ($NH_4VO_3$)
vanadium napthenate
vanadyl acetylacetonate
tetraisopropyl titanate
tetranonyl titanate
tetra-(2-ethylhexyl) titanate
thorium (IV) oxide
thorium acetylacetonate

COMPOUND B cobalt (II) hydroxide
cobalt (II) acetylacetonate
cobalt (II) napthtenate
cobalt (II) octoate≡2-ethylhexanoate
cobalt (II) acetate
cobalt (II) carbonate
nickel (II) hydroxide
nickel (II) acetylacetonate
nickel (II) naphthenate
nickel (II) octoate≡2-ethylhexanoate
nickel (II) acetate
nickel (II) carbonate
nickel dimethylglyoxime
iron (III) oxide
iron (III) acetylacetonate
iron (III) chloride/bromide
ferrocene
manganese (III) acetylacetonate
manganese (III) naphthenate
manganese (III) oxide
manganese (II) p-tertiary-butylbenzoate
manganese (II) octoate
manganese (II) nonylsalicylate The particularly preferred catalysts are, using molybdenyl acetylacetonate as compound A, e.g.:

CATALYSTS

A (molybdenyl acetylacetonate):
   (1) _____ cobalt (II) hydroxide
   (2) _____ cobalt (II) acetylacetonate
   (3) _____ cobalt (II) naphthenate
   (4) _____ cobalt (II) octoate≡2-ethylhexanoate
   (5) _____ cobalt (II) acetate
   (6) _____ cobalt (II) carbonate
   (7) _____ nickel (II) hydroxide
   (8) _____ nickel (II) acetylacetonate
   (9) _____ nickel (II) naphthenate
  (10) _____ nickel (II) octoate≡2-ethylhexanoate
  (11) _____ nickel (II) acetate
  (12) _____ nickel (II) carbonate
  (13) _____ nickel dimethylglyoxime
  (14) _____ iron (III) oxide
  (15) _____ iron (III) acetylacetonate
  (16) _____ iron (III) chloride/bromide
  (17) _____ ferrocene
  (18) _____ manganese (III) acetylacetonate
  (19) _____ manganese (III) naphthenate
  (20) _____ manganese (III) oxide
  (21) _____ manganese (II) p-tertiary-butylbenzoate
  (22) _____ manganese (II) octoate
  (23) _____ manganese (II) nonylsalicylate In the same manner, all of the other compounds A may be combined with all of the compounds B thus forming excellent catalysts.

Of course, the invention is not limited to these particular combinations. Very good catalysts are obtained by a combination of rhodium acetylacetonate with the molybdenum compounds named above, e.g.

Preferred catalysts containing both components A and B in one compound are:

cobalt molybdate ($CoMoO_4$)
nickel molybdate ($NiMoO_4$)
cobalt tungstate ($CoWO_4$)
nickel tungstate ($NiWO_4$)
cobalt vanadate [$Co(VO_3)_2$]
nickel vanadate [$Ni(VO_3)_2$]
manganese (II) molybdate ($MnMoO_4$)
manganese (II) tungstate ($MnWO_4$)
manganese (II) vanadate [$Mn(VO_3)_2$]

There is no special relationship between the valences of the metals in the compounds of groups A and B.

The process can be conducted as a homogeneous or a heterogeneous reaction. The catalyst can thus be present in solution, suspension, or on support materials, such as asbestos, activated charcoal, aluminum oxide, or silica gel. The soluble catalysts are espeically effective.

Suitable solvents are those which do not themselves react, under the reaction conditions, with the organic hydroperoxide, for example petroleum ether, aromatics, nitromethane, carbon tetrachloride, chloroform, alcohols, water, acetonitrile, and dimethyl formamide. Such solvents do not markedly influence the epoxide yields. When using chlorinated hydrocarbons as the solvent, no telomerizations or additions with the olefins are observed. Also the presence of acids or bases has no deleterious influence upon the described reactions. Therefore, these reactions can be conducted in the presence of trichloroacetic acid, acetic acid, benzoic acid, or pyridine, tert.- and sec.-amines, and sodium methylate. The amount of solvent is suitably chosen so that the entire reaction mixture remains one phase.

The organic hydroperoxide is preferably employed in quantities of 1 to 100, particularly 20 to 100 molar percent, based on the moles of ethylenically unsaturated double bond to be reacted.

The catalyst system can be used in amounts varying within very wide limits as long as a catalytic quantity is employed; preferred is an amount, based on the organic hydroperoxide, of 0.01 to 50% by weight, particularly 0.1 to 3% by weight. Likewise, the molar ratio of (A) the metallic compound of Subgroups IV to VI (to be considered the oxygen transmitter) and (B) the metallic compound of Subgroups VII to VIII, to be considered the redox catalyst, can be widely varied. A ratio of (A):(B) of 100:1 to 1:10, preferably 10:1 to 1:1 is employed.

An important prerequisite for the maximum success of the claimed process is that the reactants are not allowed to react in one flash. Rather, it is advantageous to slowly combine, in small portions, one of the two reactants which suitably already contains the catalyst, if desired, admixed with a solvent, with the other reactant which likewise can contain the catalyst.

Preferably, one reactant is charged into a reaction vessel, and the second reactant is slowly added dropwise or by pouring.

In a production scale operation of the process, the reaction can be advantageously conducted in a continuous manner by adding the reactants separately by means of metering pumps, correlated with the velocity of conversion, to a tubular reactor.

The time required for the reaction is dependent mainly upon the conditions under which the process is conducted; particularly, the reaction temperature, the type and amount of the catalyst, the proeprties of the organic hydroperoxide, and of the substance to be oxidized, as well as the final concentration of the hydroperoxide in the reaction mixture. Such a reaction time can vary between about one minute up to 10 or more days, but is normally 1 to 20 hours. When proper precautions are taken, by using turbo-agitation in an advantageous manner, that no deleterious concentrations are produced in the vessel which could lead to a violent uncontrolled reaction, and by simultaneously removing the heat of reaction effectively and quickly, a relatively rapid reaction is possible. For example, 42 g. cumene hydroperoxide are converted to above 99% with 112 g. 2-ethyl-hexane-(1) at 95° C. in the presence of 0.05 g. $MoO_2 \cdot (C_3H_7O_2)_2$ and 0.05 g. cobalt-(III)-acetyl-acetonate within 3 hours.

The organic hydroperoxide can be charged first and the olefinic compound containing the catalyst can be added thereto in small batches. However, it is also possible for example, to charge the hydroperoxide together with the catalyst and slowly add the olefinic compound. Preferably, though, the olefinic compound which is, if desired, present in excess, is provided together with the catalyst, and the organic hydroperoxide is slowly aadded at the desired temperature. The incremental batch-wise addition of the substance is conducted in all cases at a rate dependent upon its consumption or its conversion, so as to prevent a large concentration build-up in the mixture. Preferably, it is desired to avoid concentrations of the hydroperoxide in the mixture higher than 30%, or even better, higher than 10%.

It has also been noted that a careful control of the temperature contributes to the overall success of the process. The process is to be conducted at temperatures between −20° C. and +150° C.; preferred temperatures being 50–100° C., particularly about 90° C. Thus, care must be taken that the heat of reaction is satisfactorily removed, and that the mixture is simultaneously well mixed so that local overheating is avoided. Internal cooling can be employed by selecting suitable solvents and utilizing a reflux condenser.

It is advantageous to terminate the reaction before the organic peroxide is completely consumed. Preferably, the reaction is terminated when the hydroperoxide concentration falls below 3%, in order to prevent the reaction products from being subjected to high temperatures unnecessarily long.

The reaction product is worked up in accordance with the physical and chemical properties of the oxidation product. Often, the product is processed by fractional distillation, if desired under vacuum. In this process, the desired product is obtained in a practically pure form. Of course, any other type of isolation and purification process can be employed, such as precipitation, extraction, etc.

The novel process makes it possible to epoxidize olefins in an almost quantitative manner—a significant advantage over known methods. This invention is particularly distinguished by the fact that the process can be conducted under mild conditions, and in most cases very rapidly, and practically without any side reactions and formation of by-products. Especially noteworthy is that, according to this process, oxidations are successful, as compared to a lack of substantial success with peracids in the case of allyl alcohols and acid-sensitive substances. The claimed process is moreover generally applicable as the oxidation can be conducted, with substantially equally good results, in a basic, neutral, or acidic medium. There are no special costs connected with the present process, either. A further valuable feature is that the organic hydroperoxides employed herein are completely reduced to the alcohols (hydroxyhydroperoxides to the ketones) and can be obtained as such from the reaction product.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Into a 2 liter autoclave, there is charged a solution of 0.5 g. molybdenyl ($MoO_2$) acetylacetonate and 0.5 g. nickel (II) acetylacetonate in 50 g. cumene and 40 g. tert.-butanol; 500 g. propylene are then introduced under pressure. The solution is heated to 110° C. and there are added, with stirring and within one hour, 300 ml. (300 g.) of 72.5% cumyl hydroperoxide. After the agitation is continued for a further 9 hours at 110° C., the reaction mixture is cooled to room temperature. The gaseous phase is condensed in two series-connected cooling traps at −78° C. and is then subjected to fractional low temperature distillation, a residue of 5.4 g. remaining which contains, according to the HB-glacial acetic acid method, 3.2 g. propylene oxide.

The liquid phase which still contains 5.3% cumyl hydroperoxide, corresponding to 90% hydroperoxide conversion, is subjected to a fractional distillation. From the various fractions, the main portion thereof going overhead at 35–37° C., there is obtained, according to the HBrglacial acetic acid method, a total of 42.9 g. propylene oxide. Total yield: 46.1 g. [62% of theory (of theoretical yield), based on converted cumyl hydroperoxide] epoxy compound.

By shaking out the distillation residue with water and fractional distillation of the aqueous extract under vacuum, there is additionally obtained a small amount of propylene glycol.

If molybdenyl acetyl acetonate is used as the sole catalyst, there is obtained, under the same conditions, only 17% of theory of propylene oxide base on converted cumyl hydroperoxide. Likewise, if nickel (II) acetylacetonate is used by itself under the same conditions, only a 15% of theory of propylene oxide is obtained based on the converted cumyl hydroperoxide. It is therefore quite unexpected that by combining the two compounds that 62% of theory is obtained.

EXAMPLE 2

Into a 500 ml. three-necked flask provided with an agitator, a thermometer, reflux condenser, and dropping funnel, there are charged 112 g. 2-ethyl-hexene-(1), 0.05 g. molybdenyl acetylacetonate, and 0.05 g. nickel acetylacetonate. This reaction mixture is heated with the aid of an oil bath to 95° C. To this agitated mixture, there are added 45 g. 72% cumene hydroperoxide within a period of 15 minutes, and then the mixture is allowed to react for 5 hours at 95° C. The hydroperoxide content is reduced during this reaction period to 1.7%.

Upon distillation under vacuum (water aspirator) up to a temperature of 90° C., 24.6 g. 1,2-epoxy-2-ethyl hexane are obtained as overhead; this corresponds to a yield of 98% of theory, based on the hydroperoxide consumed. In an analogous experiment, but using 0.1 g. molybdenyl acetylacetonate by itself as the catalyst, the 1,2-epoxy-2-ethyl hexane is obtained in a 91% yield, and with nickel acetylacetonate by itself as the catalyst, a 45% yield is obtained.

EXAMPLE 3

The reaction is conducted analogously to Example 2, but 2 g. cobalt molybdate are used as the catalyst. After a reaction time of 5 hours, the hydroperoxide content is 2.2%. The yield in 1,2-epoxy-2-ethyl hexane is in this case 23.4 g.=96% of theory.

If cobalt acetyl acetonate is used by itself as the catalyst, an epoxide yield of 26% of theory is obtained.

EXAMPLE 4

112 g. 2-ethyl-hexene-(1), 0.05 g. vanadyl acetylacetonate, 0.05 g. manganese acetylacetonate, and 45 g. 72% cumene hydroperoxide are allowed to react analogously to Example 2. After 5 hours, there is practically no hydroperoxide present. The yield in 1,2-epoxy-2-ethyl hexane is 20.8 g.=77% of theory.

With 0.1 g. vanadyl acetylacetonate alone as the catalyst, a 63% yield in epoxide is obtained, and with manganese acetylacetonate by itself, 9.1% of theory.

EXAMPLE 5

Into an apparatus as described in Example 2, 112 g. 2-ethyl-hexene-(1), 50 ml. benzene, 0.1 g. molybdenyl acetylacetonate, and 0.05 g. nickel acetylacetonate are charged, and there are added dropwise at 95° C. 45 g. 72% cumene hydroperoxide within 15 minutes. After a reaction period of 5 hours, the hydroperoxide content decreases to below 0.5%. When distilling under vacuum, there are obtained 25.6 g. 1,2-epoxy-2-ethyl hexane=95% of theory.

EXAMPLE 5a

The reaction is conducted as in Example 5, but using 50 ml. chloroform instead of benzene. The yield is practically quantitative.

EXAMPLE 5b

The reaction is conducted as in Example 5, but using 50 ml. acetonitrile instead of benzene. The yield is practically quantitative.

EXAMPLE 6

The process is conducted as in Example 2, but adding 1 g. benzoic acid. In 5 hours, the hydroperoxide concentration falls below 0.4%. The yield in 1,2-epoxy-2-ethyl hexane is quantitative.

EXAMPLE 7

112 g. 2-ethyl-hexene-(1), 1 ml. pyridine, 0.1 g. vanadyl acetylacetonate, and 0.05 g. iron(III) acetylacetonate are allowed to react with 45 g. 72% cumene hydroperoxide, as described in Example 6, at 95° C. After 14 hours, there is still present 2% hydroperoxide. Distillation under vacuum yields 13 g. 1,2-epoxy-2-ethyl hexane.

EXAMPLE 8

100 g. cyclohexene, 3 ml. tetranonyl titanate, 0.05 g. iron(III) acetylacetonate, and 52 g. 72% cumene hydroperoxide are allowed to react, as described in Example 2, at 85° C. After 5 hours, there is practically no hydroperoxide present any more. Distillation under vacuum up to 90° C. yields about 20.6 g. 1,2-epoxy-cyclohexane =86.5% of theory.

EXAMPLE 9

The reaction is conducted as in Example 2, but the epoxidation is carried out wtih 25 g. 71% tert.-butyl hydroperoxide. After 20 hours, there is still present 1.9% hydroperoxide. There are obtained 24.2 g. 1,2-epoxy-2-ethyl hexane=88% of theory.

EXAMPLE 10

100 g. cyclododecatriene-(1,5,9), 0.1 g. vanadyl acetylacetonate, 0.05 g. manganese acetylacetonate, and 24 g. 72% cumene hydroperoxide are allowed to react as described in Example 6. After 5 hours, less than 0.4% hydroperoxide is present. The yield in 1,2-epoxy-cyclododecadiene-(5,9) is practically quantitative.

EXAMPLE 11

100 g. diallyl formal, 50 ml. tert.-butanol, 0.1 g. $MoO_2$ acetylacetonate, and 0.05 g. nickel acetylacetonate are reacted with 33 g. 72% cumene hydroperoxide, analogously to Example 2. After 14 hours, there is still present 1.5% hydroperoxide. The yield in glycidyl allyl formal is 63% of theory.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In an epoxidation process which comprises reacting an organic hydroperoxide with an ethylenically unsaturated compound of the formula >C=C< wherein the free valences are satisfied by moieties which do not interfere with the epoxidation process, the improvement which comprises conducting the reaction in contact with a catalyst composition in a concentration of about 0.01–50% by weight based on the organic peroxide, said catalyst composition consisting essentially of:
   (A) compound of vanadium, molybdenum, tungsten or titanium.
   (B) compound of manganese, iron cobalt or nickel; wherein the molar ratio of (A):(B) is 100:1 to 1:10.

2. A process as defined by claim 1 wherein the molar ratio of (A):(B) is 10:1 to 1:1.

3. A process as defined by claim 1 wherein a single compound fulfills the requirements of both compound (A) and compound (B).

4. A process as defined by claim 3 wherein said single compound is $CoMoO_4$ or $NiWO_4$.

5. A process as defined by claim 1 wherein said compounds are compounds of acetylacetone.

6. A process as defined by claim 2 wherein compound (A) is molybdenyl acetylacetonate and compound (B) is Ni(II) acetylacetonate.

7. A process as defined by claim 1 wherein the ethylenically unsaturated compound is propylene, 2-ethylhexene-1, cyclohexene, cyclododecatriene-1,5,9, or diallyl formal.

8. A process as defined by claim 1, wherein compound (A) is selected from the group consisting of molybdenyl acetylacetonate, molybdenum naphthenate, $MoO_3$ (molybdenum (VI) oxide), vanadium (V) oxide, ammonium vanadate ($NH_4VO_3$), vanadium naphthenate, vanadyl acetylacetonate, tetraiospropyl titanate, tetranonyl titanate and tetra-(2-ethylhexyl) titanate.

9. A process as defined by claim 1, wherein compound (B) is selected from the group consisting of cobalt (II) hydroxide, cobalt (II) acetylacetonate; cobalt (II) naphthenate, cobalt (II) octoate≡cobalt (II) acetate, cobalt (II) carbonate, nickel (II) hydroxide, nickel (II) acetylacetonate, nickel (II) naphthenate, nickel (II) octoate≡nickel (II) acetate, nickel (II) carbonate, nickel dimethylglyoxime, iron (III) oxide, iron (III) acetylacetonate, iron (III) chloride/bromide, ferrocene, manganese (III) acetylacetonate, manganese (III) naphthenate, manganese (III) oxide, manganese (II) p-tertiary-butylbenzoate, manganese (II) octoate, and manganese (II) nonylsalicylate.

10. A process as defined by claim 11, wherein compound (B) is selected from the group consisting of cobalt (II) hydroxide, cobalt (II) acetylacetonate, cobalt (II) naphthenate, cobalt (II) octoate≡cobalt (II) acetate, cobalt (II) carbonate, nickel (II) hydroxide, nickel (II) acetylacetonate, nickel (II) naphthenate, nickel (II) octoate≡nickel (II) acetate, nickel (II) carbonate, nickel dimethylglyoxime, iron (III) oxide, iron (III) acetylacetonate, iron (III) chloride/bromide, ferrocene, manganese (III) acetylacetonate, manganese (III) naphthenate, manganese (III) oxide, manganese (II) p-tertiary-butylbenzoate, manganese (II) octotate and manganese (II) nonylsalicylate.

11. A process as defined by claim 3, wherein said single compound is selected from the group consisting of cobalt molybdate, nickel molybdate, cobalt tungstate, nickel tungstate, cobalt vanadate, nickel vanadate, manganese (II) molybdate, manganese (II) tungstate, and manganese (II) vanadate.

12. A process as defined by claim 1, wherein compound (A) is a compound of molybdenum or vanadium.

13. A process as defined by claim 1, wherein said reaction is conducted by the incremental addition of said organic hydroperoxide or said ethylenically unsaturated compound.

14. A process as defined by claim 1, wherein the reaction is conducted by incrementally adding said organic hydroperoxide to a charge of said ethylenically unsaturated compound mixed with said catalyst composition.

15. A process as defined by claim 1, wherein said reaction is conducted at temperatures between $-20°$ C. and $+150°$ C.

16. A process as defined by claim 1, wherein said reaction is conducted at 50–100° C.

17. A process as defined by claim 1, wherein said reaction is conducted at about 90° C.

18. A process as defined by claim 1 wherein said catalyst composition is added in a concentration of 0.1–3% by weight based on the organic hydroperoxide.

References Cited

UNITED STATES PATENTS 3,351,635  11/1967  Kollar.

OTHER REFERENCES

C. A., vol. 62, 16192e, by Kollar, June 1965.

Smith's College Chemistry, 7th ed., EHRET, 1960, pp. 728–29 and 258.

CRC Handbook of Chemistry and Physics, 48th ed., ©1964, 65, 66, and 67, page B-3.

HENRY R. JILES, Primary Examiner

S. D. WINTERS, Assistant Examiner

UNITED STATES PATENT OFFICE
CERTIFICATE OF CORRECTION

Patent No. 3,526,645　　　　　　　　Dated September 1, 1970

Inventor(s) Erwin Vangermain and Jürgen Wolpers

It is certified that error appears in the above-identified patent and that said Letters Patent are hereby corrected as shown below:

Column 9, Line 34, change "claim 11" to ---claim 8---

Signed and sealed this 20th day of April 1971.

(SEAL)
Attest:

EDWARD M. FLETCHER, JR.　　　　　　　WILLIAM E. SCHUYLER, JR.
Attesting Officer　　　　　　　　　　Commissioner of Patents